Nov. 21, 1933.  Q. H. FOSTER ET AL  1,936,504
SAFETY VALVE SYSTEM FOR HYDRAULIC BRAKES
Filed May 24, 1932
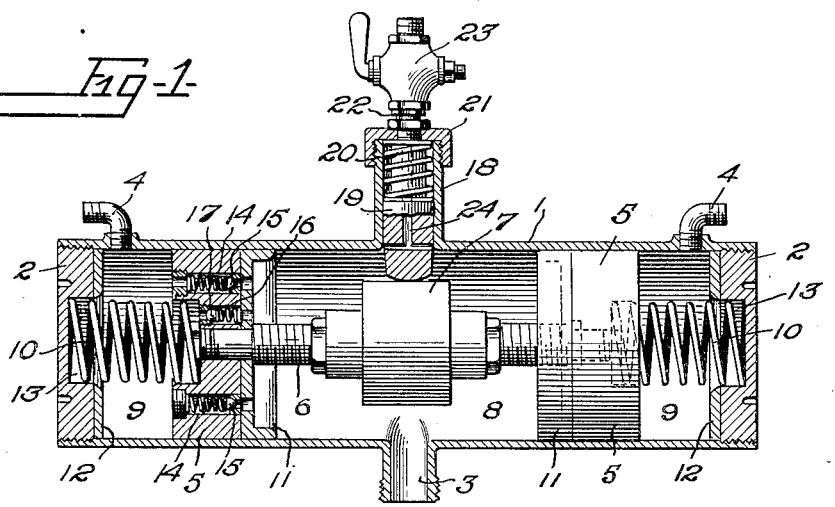
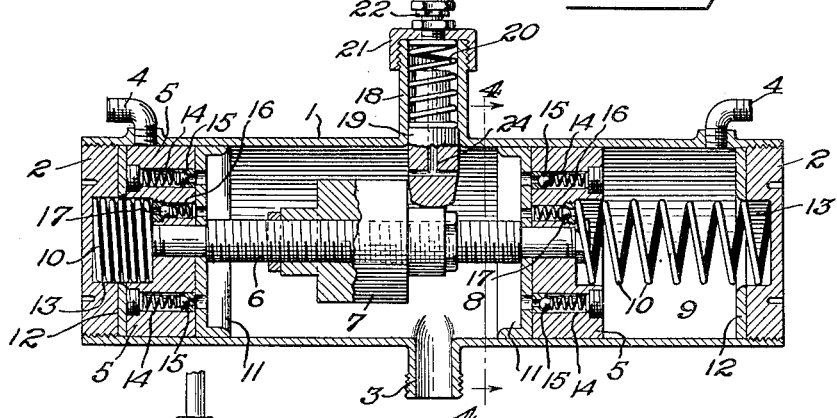
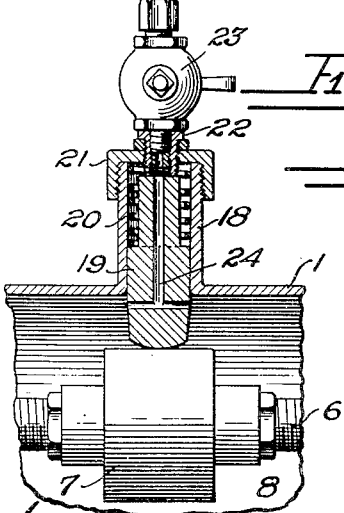
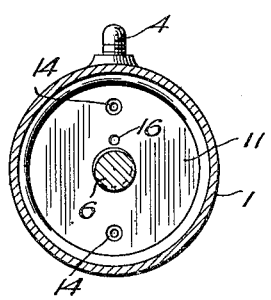
Quay H. Foster,
Clair C. Brock,
INVENTORS
BY Victor J. Evans & Co.
ATTORNEY Patented Nov. 21, 1933

1,936,504

UNITED STATES PATENT OFFICE 1,936,504

SAFETY VALVE SYSTEM FOR HYDRAULIC BRAKES

Quay H. Foster and Clair C. Brock, Harrisville, Pa.

Application May 24, 1932. Serial No. 613,252

1 Claim. (Cl. 303—84)

This invention relates to safety devices for fluid brakes employed on motor vehicles of all types and has for the primary object, the provision of a device of the above stated character which may be easily and quickly installed in a brake system now in use without undue alterations and which will automatically close the fluid to that part of the system which may develop a leak or loss of pressure from any cause, permitting the other portions of the brake system to function normally.

Another object of this invention is the provision of a convenient means for bleeding the device and the portion of the brake system including the master cylinder and its piston.

With these and other objects in view, this invention consists in certain novel features of construction, combination and arrangement of parts to be hereinafter more fully described and claimed.

For a complete understanding of our invention, reference is to be had to the following description and accompanying drawing, in which Figure 1 is a vertical sectional view illustrating a safety device constructed in accordance with our invention.

Figure 2 is a similar view showing the device closing one portion of the brake system while the other portion of said system is free to operate normally.

Figure 3 is a fragmentary sectional view illustrating the means for bleeding the device.

Figure 4 is a sectional view taken on the line 4—4 of Figure 2.

Referring in detail to the drawing, the numeral 1 indicates a cylinder closed at its ends by removable heads 2 and provided intermediate its ends with an inlet nipple 3 adapted to be connected in any suitable manner to the master cylinder of a pneumatic or hydraulic brake system. Outlet pipes 4 are in communication with the interior of the cylinder 1 adjacent the heads 2 and one of the outlet pipes 4 is connected to the pipes or tubes of the front brakes of the vehicle while the other outlet pipe 4 is connected to the tubes or pipes of the rear brakes.

A pair of pistons 5 is slidably mounted in the cylinder and the pistons are connected by a rod 6 on which is located an annular locking member 7. The pistons 5 form in the cylinder an intermediate chamber 8 and end chambers 9, the latter named chambers being in continuous communication with the respective outlet pipes 4, while the intermediate chamber 8 is in communication with the inlet nipple 3. The shifting of the pistons 5 in the cylinder 1 in one direction will close one of the outlet pipes and when shifted in an opposite directon one of the pistons will close the other outlet pipe. Centering springs 10 of the coiled type are interposed between the pistons 5 and the heads 2 for normally positioning the pistons to uncover the outlet pipes 4 and to position the annular locking member 7 in alignment with the inlet nipple 3. The opposing faces of the pistons are provided with cup shaped washers 11 frictionally engaging the walls of the cylinder 1 to prevent escape of fluid around the pistons from one chamber to another. The inner faces of the heads 2 are provided with yieldable seats 12 to be engaged by the pistons when shifted endwise. When one of the pistons is positioned to close one of the outlets, said piston engages the seat of the head at that end of the cylinder. The pistons and heads are provided with centrally arranged recesses 13 forming seats for the ends of the centering springs 10.

The pistons 5 and their cup shaped washers 11 are provided with passages 14 therethrough controlled by spring-pressed check valves 15. The passages 14 are adapted to permit fluid pressure in the chamber 8 to pass into the chambers 9. The pistons 5 and their cup shaped washers 11 are provided with other passages 16 controlled by spring-pressed check valves 17 adapted to permit fluid pressure from the chambers 9 to pass into the chamber 8.

A neck 18 is formed on the cylinder 1 opposite the nipple 3 and has slidably mounted therein a plunger 19 engaged by a spring 20 for normally urging the plunger into engagement with the annular locking member 7. The neck 18 is closed by a removable cap 21 in which is threaded a bushing 22 carrying a manually operated valve 23. The plunger 19 is provided with a passage 24 communicative with the interior of the cylinder and with the bushing of the valve.

The normal position of the pistons 5 is as shown in Figure 1 and when the master piston of the master cylinder is actuated to apply the brakes in the usual manner, the fluid is forced into the chamber 8 and through the pistons into the chambers 9 and to the front and rear brake cylinders by the outlet pipes 4. The pressure is equal on both sides of the pistons, consequently the pistons maintain the position shown in Figure 1. Should a leak or break occur in the front or rear brake system, the pressure recedes and the pistons shift endwise due to the unequalized pressure thereon. One piston thus engages the head 2 at the end of the cylinder to which the leaking part of the system is attached, consequently closing the respective outlet pipe 4 and preventing waste of the fluid but the other part of the brake system can function normally due to the fluid passing outwardly through the other outlet pipe 4 which is uncovered. When the pistons shift endwise to bring about cutting out of part of the brake system, the plunger moves into engagement with one side of the annular locking member 7 as shown in Figure 2 thereby locking the pistons in the position shown in Figure 2. After the repair has been made on the brake system, the cap 21 is removed, releasing the tension on the spring so that the plunger 19 may be manually raised. The raising of the plunger frees the pistons and the springs 10 return them to their neutral or normal position as shown in Figure 1.

When it is desired to bleed the cylinder 1 of air, the valve 23 is opened. If it be desired to bleed the wheel cylinders, the bushing 22 of the valve 23 is threaded downwardly to force the plunger in tight engagement with the periphery of the annular locking member 7, and the valve 23 is opened. This locks the pistons against movement and the operator then actuates the brake pedal of the brake system, causing the master piston to circulate the fluid from the master cylinder into the chamber 8, and any air contained within the fluid may then pass outwardly to the atmosphere by way of the passage 24 and the valve 23.

From the foregoing description it will be noted that the safety device is capable of application or use on hydraulic or pneumatic brakes and is easily applicable to brake systems of the stated character or in use without undue alterations, consequently reducing the cost of installation. Further, it is to be noted that the device consists of few parts which may be easily replaced when worn. The annular locking member 7 is threaded to the rod 6 and is held in any adjusted position thereon by lock nuts arranged on the rod 6 at the ends of the annular member.

While we have shown and described the preferred embodiment of our invention, it will be understood that minor changes in construction, combination and arrangement of parts may be made without departing from the spirit and scope of our invention, as claimed.

Having thus described our invention, what we claim is:—

A safety device for fluid brakes comprising a cylinder, connected pistons slidable in the cylinder and forming intermediate and end chambers, said pistons having passages, check valves in said passages to permit fluid to pass from the intermediate chamber to the end chambers and from the end chambers to the intermediate chamber, outlet pipes in communication with the end chambers and connected to brake cylinders of a brake system and either pipe closed by one of the pistons when said pistons move endwise due to unequal pressure thereon, means for connecting the intermediate chamber to the master cylinder of the brake system, centering springs engaging the pistons, an annular locking member carried by the pistons, a neck on the cylinder, a spring-pressed plunger carried by the neck and engageable with the periphery of the annular member and adapted to engage the end of the annular member when the pistons shift endwise to lock said pistons in their shifted position, a removable cap for the neck, a bushing carried by the cap and extending into the neck and adjustable relative thereto, and a valve connected to the bushing, said plunger having a vent opening controlled by the last named valve, and said bushing being adapted to be adjusted to thrust the plunger tightly against the periphery of the annular member for locking the pistons against shifting.

QUAY H. FOSTER.
CLAIR C. BROCK.